P. L. PLANK.
SAFETY SNAP HOOK.
APPLICATION FILED FEB. 28, 1918. RENEWED NOV. 16, 1918.
1,293,543. Patented Feb. 4, 1919.
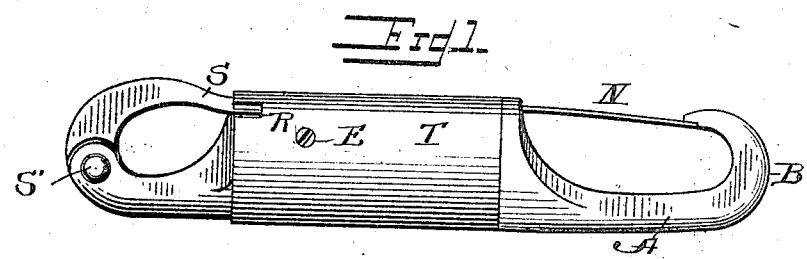
Fig. 1.
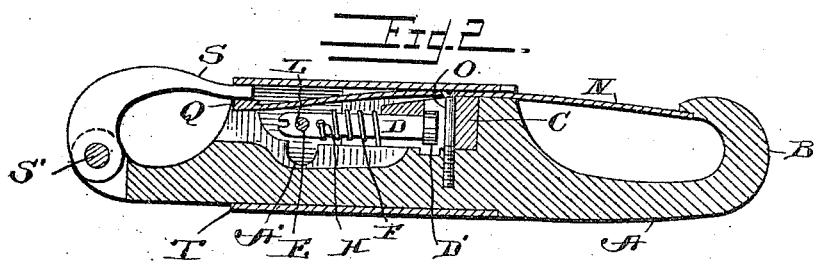
Fig. 2.
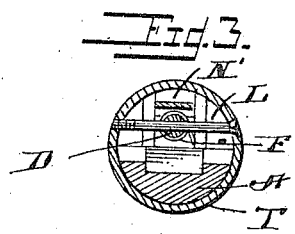
Fig. 3.
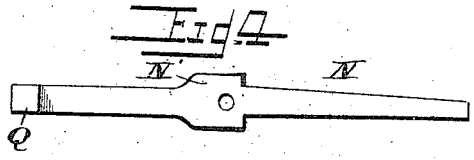
Fig. 4.
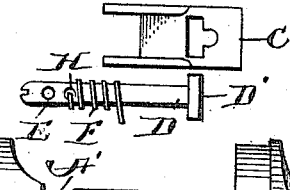
Witnesses
J. M. Fowler Jr.
A. L. Hough
Inventor
Pryor L. Plank
Franklin H. Hough
Atty

UNITED STATES PATENT OFFICE.

PRYOR L. PLANK, OF ENTERPRISE, OREGON.

SAFETY SNAP-HOOK.

1,293,543.  Specification of Letters Patent.  Patented Feb. 4, 1919.

Application filed February 28, 1918, Serial No. 219,636. Renewed November 16, 1918. Serial No. 262,906.

*To all whom it may concern:*

Be it known that I, PRYOR L. PLANK, a citizen of the United States, residing at Enterprise, in the county of Wallowa and State of Oregon, have invented certain new and useful Improvements in Safety Snap-Hooks; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in safety snap hooks and consists of a simple and efficient device of this nature so arranged that the hook may be easily and quickly released by slight turning of a sleeve forming a part of the same.

The invention consists of further details of construction, combinations and arrangements of parts which will be hereinafter fully described, shown in the accompanying drawings and then specifically defined in the appended claims.

I illustrate my invention in the accompanying drawings which, with the letters of reference marked thereon, form a part of this specification and in which:

Figure 1 is a side elevation.

Fig. 2 is a central longitudinal sectional view through the same.

Fig. 3 is a cross sectional view centrally through the snap hook.

Fig. 4 is a view showing the parts disassembled.

Reference now being had to the details of the drawings by letter:

A designates the shank portion of a hook B and which shank portion is of cylindrical outline and provided with a longitudinal recess adapted to receive the plug C which is slotted to receive the pin D having a head D' seated in the recessed walls of the slot of said plug and which has a threaded aperture E therein. A coiled spring F is mounted about said pin and has one end held against the bottom of the recess in the shank portion A and its other end is passed through an aperture H formed in the pin. A spring N has a widened portion N' seated in a recess formed in the outer face of said plug and said spring is held in place by means of a screw O passing through an aperture in the widened portion of the shank portion of the spring and also the shank portion A of the hook. The inner end of the spring has a lug Q which is adapted to engage the recess R formed in the end of the cylinder T which telescopes over the cylindrical portion A of the shank of the hook B. A screw L is passed through registering apertures in the shell and also through the threaded aperture in said pin and the shank A, adjacent to said screw L, is recessed away as at A' to permit the shell and shank portion to have slight axial movements one independent of the other sufficient to release the pivotal hook S, which is pivotally mounted upon a pin S' carried in the slotted contracting end of the shank portion A.

In operation, when the parts are assembled as shown in Fig. 1 of the drawings, the hook S is held in a locked position within the sleeve. It will be noted that when the hook S is in a locked relation it is held by the lug upon the inner end of the spring against the inner surface of the sleeve. When it is desired to release the hook, a partial axial rotary movement is given to the sleeve and when the end of the hook S comes in registration with the slot in the end of the sleeve the spring will throw the hook loose and the lug engaging the recess in the sleeve will hold the latter and the shank portion of the hook from further rotary movement. To lock the hook, the operation is reversed, the end of the hook S being placed against the lug and partial revolution given to the sleeve, which will throw the hook to a locked position.

What I claim to be new is:

1. A safety snap hook comprising a hook having a cylindrical shank portion, a spring fastened to said shank portion and having a resilient end with a lug thereon, a sleeve journaled upon the shank portion of the hook, a spring actuated pin mounted in a recess in the shank of the hook, a screw passing through apertures in the sleeve and engaging an aperture in said pin, said sleeve having a slight axial movement independent of said shank upon which it is mounted, one end of the sleeve adapted to receive said lug, and a pivotal hook mounted upon the end of said shank portion, and adapted to be depressed against said lug and when the sleeve is given partial revolution to be held by the sleeve in a locked relation.

2. A safety snap hook comprising a hook with a cylindrical shank portion which is recessed, a plug mounted in said recess, a headed pin mounted in a slot in the plug, a coiled spring, one end fastened to the pin and the other to said shank portion of the hook and provided with an aperture, a spring fastened to said plug in said shank portion and having a resilient end with a lug thereon, a sleeve journaled upon said shank portion provided with a recess in one end, and oppositely disposed apertures, a screw passing through said apertures, and an aperture in said pin, a hook pivoted to the projecting end of said shank portion adapted to be held by said lug against the inner surface of the sleeve.

In testimony whereof I hereunto affix my signature in presence of two witnesses.

PRYOR L. PLANK.

Witnesses:
C. A. MOORE,
M. W. E. ALLEN.

Copies of this patent may be obtained for five cents each, by addressing the "Commissioner of Patents, Washington, D. C."